United States Patent [19]

Jones

[11] Patent Number: 4,579,576

[45] Date of Patent: Apr. 1, 1986

[54] MOULD ARRANGEMENT FOR GLASSWARE FORMING MACHINE

[75] Inventor: Stanley P. Jones, Tickhill, England

[73] Assignee: Emhart Industries, Inc., Farmington, Conn.

[21] Appl. No.: 763,170

[22] Filed: Aug. 7, 1985

Related U.S. Application Data

[63] Continuation of Ser. No. 587,425, Mar. 8, 1984, abandoned.

[30] Foreign Application Priority Data

Mar. 17, 1983 [GB] United Kingdom ............... 8307462

[51] Int. Cl.$^4$ ............................................. C03B 9/20
[52] U.S. Cl. ....................................... 65/265; 65/267; 65/319; 65/356
[58] Field of Search .................. 65/265, 267, 319, 356

[56] References Cited

U.S. PATENT DOCUMENTS

| | | | |
|---|---|---|---|
| 3,094,404 | 6/1963 | Lauck | 65/319 |
| 3,235,354 | 2/1966 | Andersen | 65/355 |
| 3,355,277 | 11/1967 | Miller | 65/355 |
| 3,499,746 | 3/1970 | Blankenship et al. | 65/265 |
| 3,586,491 | 6/1971 | Mennitt | 65/265 |
| 3,617,232 | 11/1971 | Goodwin | 65/267 |
| 3,666,433 | 5/1972 | Nebelung et al. | 65/158 |
| 3,860,407 | 1/1975 | Fertik | 65/161 |
| 4,070,174 | 1/1978 | Nebelung et al. | 65/229 |
| 4,251,253 | 2/1981 | Becker et al. | 65/267 |
| 4,361,434 | 11/1982 | Schneider | 65/265 |
| 4,388,099 | 6/1983 | Hermening et al. | 65/267 |

FOREIGN PATENT DOCUMENTS

| | | |
|---|---|---|
| 881161 | 5/1980 | Belgium . |
| 3123488 | 11/1982 | Fed. Rep. of Germany . |
| 610157 | 6/1926 | France . |
| 1320185 | 1/1963 | France . |
| 2011128 | 7/1979 | United Kingdom . |
| 267843 | 4/1970 | U.S.S.R. . |
| 794020 | 1/1981 | U.S.S.R. . |

Primary Examiner—Arthur Kellogg
Attorney, Agent, or Firm—H. Samuel Kieser

[57] ABSTRACT

The mould arrangement is for use in a cyclicly operating glassware forming machine. A plenum chamber, forming part of a bottom plate mechanism on which a bottom plate of the mould is carried, extends beneath a mould of the arrangement and has exits through which cooling air may leave the plenum chamber and enter cooling passages in side portions of the mould when the latter are in a closed position thereof. Air is blown into the plenum chamber for a predetermined period in each cycle of operation of the machine and leaves the plenum chamber through the exits thereby cooling the mould by passing through the passages in the side portions thereof. The air leaving the plenum chamber may first pass through passages in the bottom plate of the mould which communicate with the passages in the side portions.

7 Claims, 3 Drawing Figures

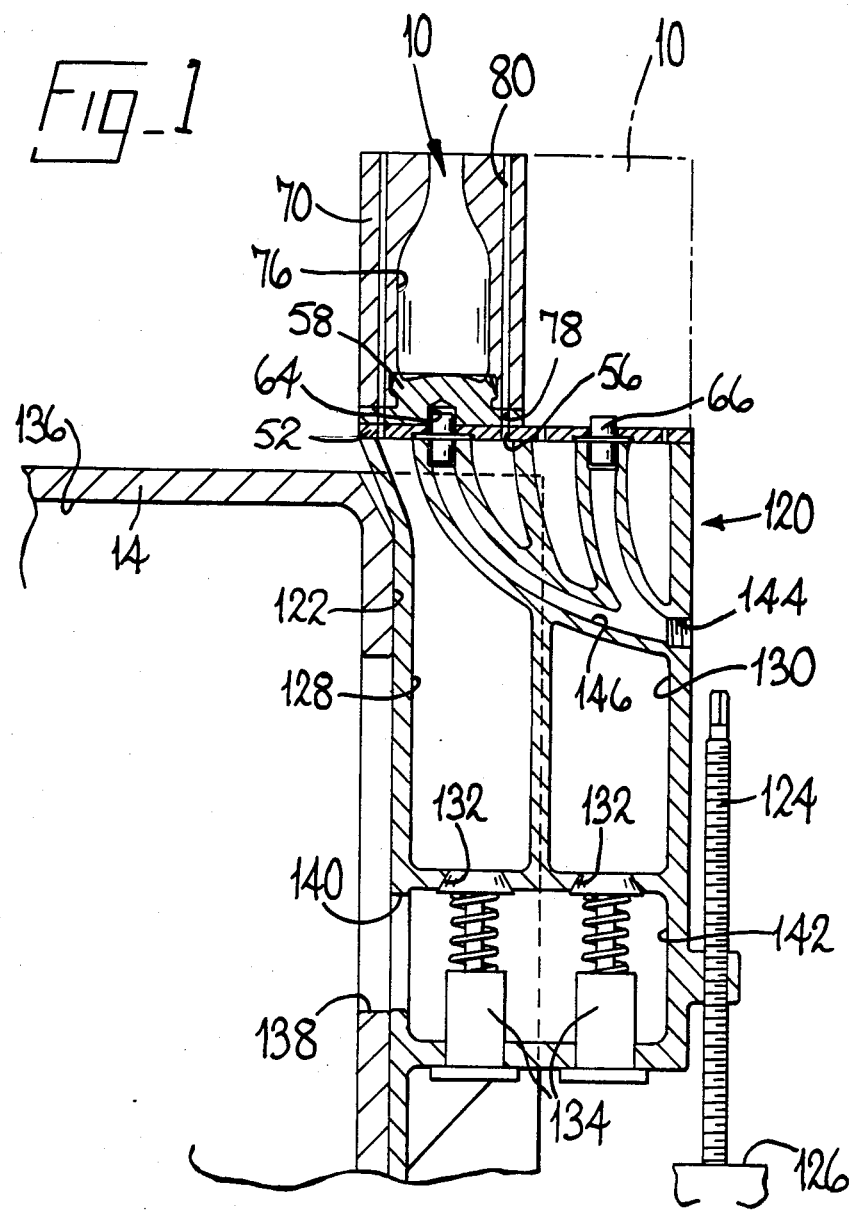

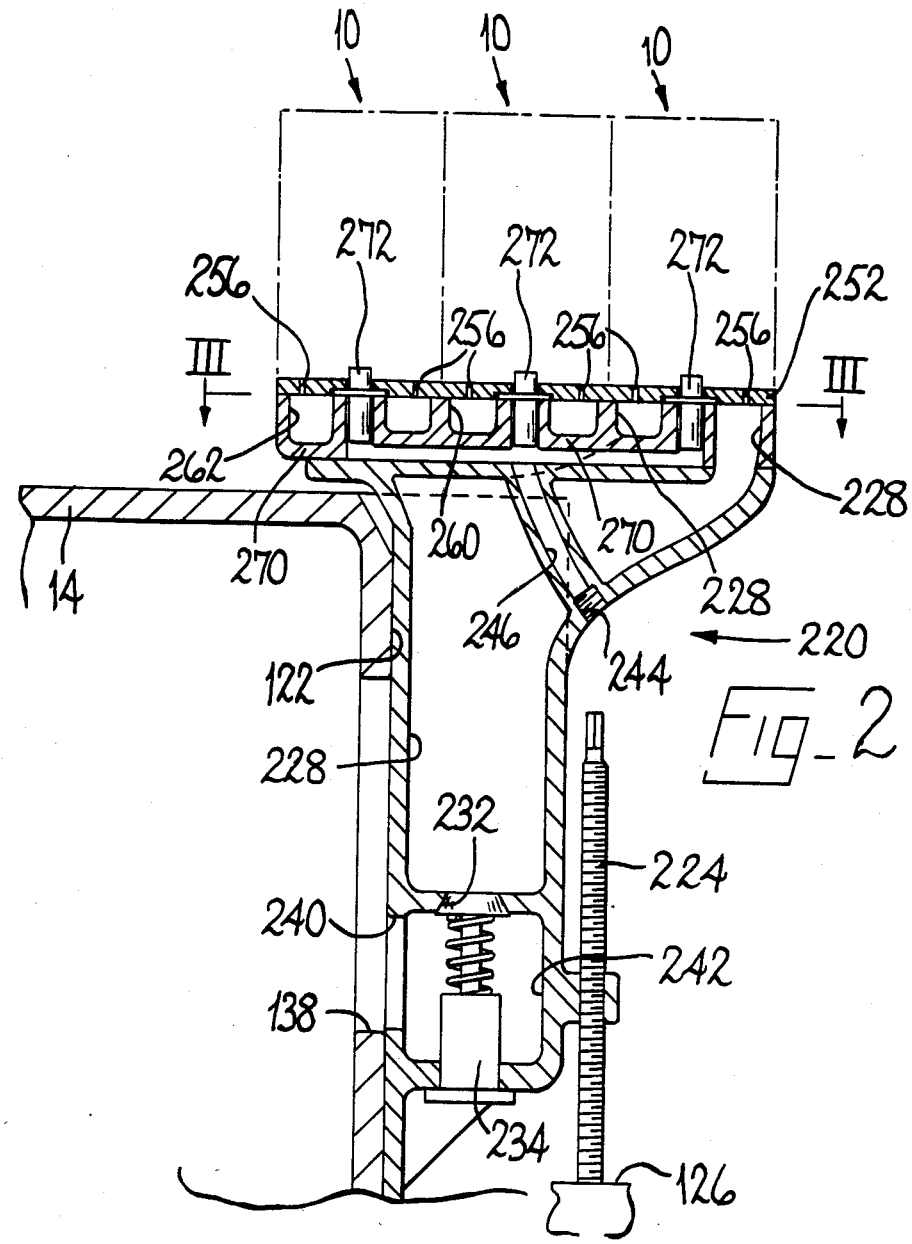

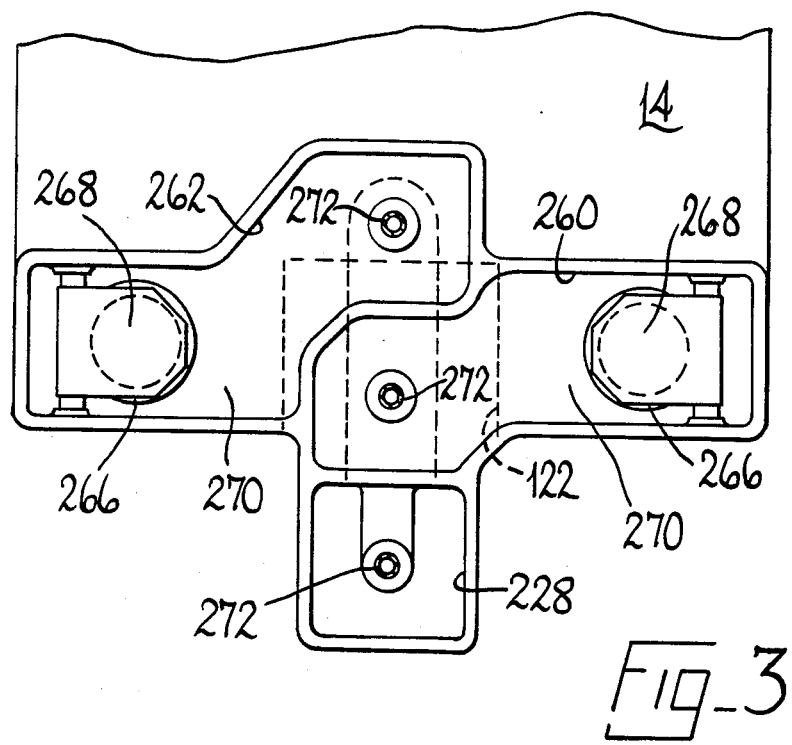

MOULD ARRANGEMENT FOR GLASSWARE FORMING MACHINE

This application is a continuation of application Ser. No. 587,425, filed Mar. 8, 1984, now abandoned.

BACKGROUND OF THE INVENTION

This invention is concerned with a mould arrangement for use in a cyclicly operating glassware forming machine, the arrangement comprising a mould comprising a bottom plate defining a bottom portion of a cavity of the mould, and two side portions defining side portions of the cavity, the side portions being movable towards one another into a closed position thereof, in which the side portions engage the bottom plate and one another to co-operate in defining the mould cavity, and away from one another into an open position thereof to allow moulded articles to be removed from the mould, the side portions also defining passages through which cooling air can pass to cool the side portions.

In a glass container manufacturing machine of the so-called "individual section" type, a number of container making units or sections are arranged side by side, are fed with glass from a common source, and feed their output to a common conveyor. Each of these sections has at least one parison mould in which a parison is formed from a gob of molten glass delivered to the mould, and at least one blow mould in which parison are blown to the shape of the container. The blow mould comprises a stationary bottom plate which defines the bottom portion of a cavity of the mould and two side portions defining side portions of the cavity. The two side portions are mounted on supporting arms which are movable to move the side portions towards one another into a closed position in which the side portions engage the bottom plate and each other so that a parison is enclosed in the cavity defined by the side portions and the bottom plate. The arms are also movable to move the side portions away from one another into an open position to allow moulded articles to be removed from the mould.

Since the moulds of an individual section type machine absorb heat from the glass at a rate which is faster than the heat can be dissipated to the surrounding atmosphere without additional cooling, such moulds are supplied with cooling means which cool the mould so that it remains at a substantially constant temperature during successive operations of the machine. Because the sections of an individual section type machine need to be close together, for reasons of glass supply, only very limited space is available around the mould for the provision of cooling means. One solution to this problem is to feed the cooling air through the frame of the machine section to a vertical cooling stack which is provided with nozzles which direct air on to the outside of the mould. This solution, however, has the disadvantage that the arms supporting the side portions of the mould interfere with the flow of the air to the mould and also it is difficult to provide differential cooling around the mould as may be required. Furthermore, such cooling stacks are a source of undesirable noise. In another type of cooling means, the cooling air is supplied through the supporting arms of the side portions of the mould to a chamber around the mould or to passages within the mould. This type has the disadvantage that it requires expensive machining of the arms, to allow both for the movement of the arms and for the flow of the cooling air. Furthermore, as a seal has to be provided between the arm and the side portion of the mould, delays occur in changing moulds.

In the specification of U.S. patent application Ser. No. 527,589 filed Aug. 29, 1983, there is described a mould arrangement in which cooling air can be supplied to side portions of the mould without the cooling air passing through the supporting arms. In this mould arrangement, the passages in each side portion of the mould each have an entrance in a bottom surface of that side portion and the arrangement also comprises a plenum chamber and air supply means arranged to supply mould cooling air to the plenum chamber for a predetermined period in each cycle of operation of the machine during which the side portions are in their closed position, the plenum chamber extending beneath the side portions and having exits which, when the side portions are in their closed position, communicate with the entrances of the passages so that air can leave the plenum chamber and pass through the passages.

In the mould arrangement described in the aforementioned specification, the bottom plate of the mould is mounted on a bottom plate mechanism which is mounted for vertical adjustment on a supporting frame of the machine and the plenum chamber is also mounted on the bottom plate mechanism. The bottom plate mechanism is mounted on a slideway in a vertically extending recess of the machine and the plenum chamber extends horizontally over the frame and has an entrance which receives the air supplied by the air supply means through a telescopic connection to the interior of the frame.

While the arrangement described in the aforementioned specification is satisfactory in many respects, it cannot readily be adapted to operate in the "triple gob" mode in which each section of the machine moulds three containers simultaneously; this is because there are only two air passages in the section frame which can be utilised for supplying air to the plenum chambers. Also, because the plenum chamber extends over the section frame, the height of containers which can be moulded in the machine is limited.

It is an object of the present invention to provide a mould arrangement in which cooling air can be supplied to side portions of the mould without the cooling air passing through the supporting arms and in which the above mentioned disadvantages are overcome.

BRIEF SUMMARY OF THE INVENTION

The invention provides a mould arrangement for use in cyclicly operating glassware forming machine, the arrangement comprising a mould comprising a bottom plate defining a bottom portion of a cavity of the mould and being mounted on a bottom plate mechanism which is mounted for vertical adjustment on a supporting frame of the machine, and two side portions defining side portions of the cavity, the side portions being movable towards one another into a closed position thereof, in which the side portions engage the bottom plate and one another to co-operate in defining the mould cavity, and away from one another into an open position thereof to allow moulded articles to be removed from the mould, the side portions also defining passages through which cooling air can pass to cool the side portions, wherein the passages in each side portion of the mould each have an entrance in a bottom surface of that side portion and the arrangement also comprises a plenum chamber forming part of the bottom plate mechanism and air supply means arranged to supply mould cooling air to the plenum chamber for a predetermined period in each cycle of operation of the machine during which the side portions are in their closed position, the plenum chamber extending beneath the side portions and having one or more exits which, when the side portions are in their closed positions, communicate with the entrances of the passages so that air can leave the plenum chamber and pass through the passages, and wherein the bottom plate mechanism is mounted on a slideway in a vertically extending recess of the machine and the plenum chamber extends downwards in the mechanism and has an entrance which received the air supplied by the air supply means.

Since, in a mould arrangement in accordance with the last preceding paragraph, the plenum chamber extends downwards in the bottom plate mechanism, greater height is available for the moulds as the plenum chamber does not extend over the frame of the machine. Furthermore, as will appear from the description hereinafter, it is possible to provide three plenum chambers so that the machine can operate in the triple gob mode.

In order to provide control for the length of time during which cooling takes place, the opening in the portion of the frame bordering the recess may communicate with a chamber in the bottom plate mechanism which communicates with the plenum chamber via a valve which is open only during a predetermined period in each cycle of operation of the machine.

In order to provide that the machine can operate in the double gob mode, the arrangement may comprise a further plenum chamber which extends downwards in the mechanism and which extends beneath the side portions of a further mould and has exits which, when the side portions are in their closed position, communicate with entrances of passages in the side portions of the further mould, and the air supply means is arranged to supply mould cooling to the air further plenum chamber.

In order to enable vacuum to be supplied to the bottom plate of the mould, as is desirable in many moulding operations, the bottom plate mechanism may comprise a connection to a source of vacuum which is connected to the bottom plates of the moulds by a branch pipe which passes through the plenum chambers but is sealed therefrom.

In order to enable the machine to operate in the triple gob mode, two further plenum chambers may extend horizontally above the frame of the machine and have the entrances which receive air supplied by the air supply means to telescopic connections to the interior of the frame on opposite sides of the recess, the further plenum chambers each extending beneath the side portions of a respective further mould and having exits which, when the side portions are in their closed position, communicate with entrances of passages in the side portions of the respective further mould. It should be noted that in the triple gob mode, it is usually unnecessary to provide the extra height provided by avoiding the plenum chamber extending over the machine frame.

In the triple gob mode, the bottom plate mechanism may comprise a connection to a source of vacuum which is connected to the bottom plates of the three moulds by a pipe which passes through the plenum chamber which extends downwards in the mechanism but is sealed therefrom and branches to the three bottom plates.

BRIEF DESCRIPTION OF THE DRAWINGS

There now follows a detailed description, to be read with reference to the accompanying drawings, of two mould arrangements which are illustrative of the invention. It is to be understood that the illustrative mould arrangements have been selected for description by way of example and not of limitation of the invention.

In the drawings:

FIG. 1 is a vertical cross-sectional view of the first illustrative mould arrangement;

FIG. 2 is a view similar to FIG. 1 showing the second illustrative mould arrangement; and FIG. 3 is a view taken on the line III—III in FIG. 2.

DETAILED DESCRIPTION OF PREFERRED EMBODIMENT OF THE INVENTION

The first illustrative mould arrangement (shown in FIG. 1) comprises two identical moulds 10 arranged side by side along a lingitudinal axis of a section of a cyclicly operating glassware forming machine of the individual section type. Each mould comprises two side portions 70 which are mounted on supporting arms (not shown), which arms are movable by moving means (not shown), in conventional manner, to move the side portions 70 of each mould towards one another into a closed position thereof, (shown in FIG. 1) or away from one another into an open position thereof to allow moulded articles to be removed from the mould 10. Each mould also comprises a bottom plate 58 which rests on a sealing plate 52. The bottom plate 58 defines a bottom portion of a cavity 76 of the mould and the two side portions 70 define side portions of the cavity 76. In their closed position the side portions 70 engage the bottom plate 58 and one another to co-operate in defining the mould cavity. The side portions 70 also define passages 80 which pass upwardly through the mould side portions 70 and have entrances in a bottom surface of the side portion 70 which communicate via passages 78 in the bottom plate 58 with passages 56 through the sealing plate 52.

The sealing plate 52 forms part of a bottom plate mechanism 120 which is mounted for vertical adjustment on the machine frame 14 of the machine. The mechanism 120 is mounted in a recess 122 in the frame 14. The vertical adjustment is by means of a screw 124 threadedly received in the mechanism 120 and bearing on a horizontal surface 126.

The mechanism 120 also comprises walls which define a first plenum chamber 128 and a second plenum chamber 130. Each of the plenum chambers 128, 130 extends downwards in the mechanism beneath one of the moulds 10 so that air supplied to the plenum chamber passes through the passages 56, 78, 80 and acts to cool the mould 10. At the bottom thereof each of the plenum chambers has an entrance 132 which can be opened or closed by means of a solenoid operated valve 134, there being a valve 134 associated with each plenum chamber so that air can be supplied independently to the respective plenum chambers 128 and 130. The first illustrative mould arrangement also comprises air supply means arranged to supply mould cooling air to the plenum chambers 128 and 130 for a predetermined period in each cycle of operation of the machine during which the side portions 70 are in their closed position. The air supply means comprises blowing means (not shown) operable to blow air into a chamber 136 within the frame 14. The air passes from the chamber 136 through a vertically-extending opening 138 in the portion of the frame 14 which borders the recess 122 and enters the mechanism 120 through an entrance 140 into a chamber 142 which contains the valves 134. When the valves 134 are in their open position, air can pass from the chamber 142 into the plenum chambers 128, 130. Thus, each plenum chamber 128, 130 has an entrance 132 which receives the air supplied by the air supply means from a vertically-extending opening 138 in the frame 14.

The bottom plate mechanism 120 also comprises a connection 144 to a source of vacuum (not shown). The connection 144 is connected to the source of vacuum by means of a flexible pipe and is connected to the bottom plates 58 of the moulds 10 by a branched pipe 146 which passes through the plenum chambers 128 and 130 but is sealed therefrom. The branched pipe 146 communicates with a floating adaptor 66 which passes through a hole in the sealing plate and is received in a recess 64 in the bottom plate 58.

In the second illustrative mould arrangement, shown in FIGS. 2 and 3, the machine is arranged to operate in the triple gob mode. In this mode there are three moulds 10 arranged side by side. The three moulds 10 each have a bottom plate which is mounted on top of a sealing plate 252 and side portions (not shown) which are carried by moving means similar to those of the side portions 70 of the moulds of the first illustrative mould arrangement. The sealing plate 252 forms part of a bottom plate mechanism 220 which is mounted in the recess 122 in the frame 14 instead of the bottom plate mechanism 120. The bottom plate mechanism 220 is mounted on a slideway in the recess 122 for vertical adjustment by means of a screw 224 which bears on the surface 126. The mechanism 220 also comprises walls which define a single plenum chamber 228 which has an entrance 232 to a chamber 242 which in turn has an entrance 240 which communicates with the opening 138 in the frame 14. A valve 234 controls entry of air into the plenum chamber 228 through the entrance 232 from the chamber 242.

Above the top of the frame 14, two further plenum chambers 260 and 262 extend to beneath the centre mould 10 and the left hand (viewing FIG. 2) mould 10 respectively. These plenum chambers 260 and 262 are constructed in a similar manner to that described in the aforementioned patent specification and each extends beneath the side portions of its respective mould and as exits 264 which, when the respective side portions are in their closed position, communicate with entrances of passages in the side portions of the respective moulds 10. The plenum chambers 260 and 262 are supplied with air by the air supply means through telescopic connections 266 to the interior of the frame 14 on opposite sides of the recess 122. As in the plenum chambers of the aforementioned specification, the entry of air into the plenum chambers 260 and 262 is controlled by flap valves 268 which acts to open or close the entrances to the telescopic connections 266. Bottom walls 270 of the plenum chambers 260 and 262 overlie the plenum chamber 228 and prevent it from communicating with the left hand and central moulds 10.

The plenum chamber 228 extends to beneath the right hand (viewing FIG. 2) mould 10 where it has exits 256 which, when the side portions of the right hand moulds 10 are in their closed position, communicate with passages in those side portions so that air can enter these passages. The bottom plate mechanism 220 also comprises a connection 244 to a source of vacuum (not shown). The connection 244 is connected by a pipe 246 which passes through the plenum chamber 228 and is connected to the bottom plates of the three moulds 10 by branches passing upwardly through the plenum chambers 262, 260 and 228. Each of the branches of the pipe 246 terminates with an adaptor 272 which enters the bottom plate of the respective mould 10.

1. An arrangement for cooling the moulds in a glassware forming machine comprising at least one mould including a bottom plate defining a bottom portion of a cavity of the mould, a bottom plate mechanism on which said bottom plate is mounted, said mould also including side portions movable between an open and closed position, in said closed position the side portions cooperate with the bottom plate and one another to define a mould cavity and in said open position allow the moulded articles to be removed from the mould, passages in said side portions for the passage of cooling wind, said passages having an entrance in the bottom surface of said side portions, a plenum chamber forming part of said bottom plate mechanism, air supply means for supplying mould cooling air to the plenum chamber for a predetermined period in each cycle of operation during which said side portions are in said closed position, said plenum chamber being positioned under the side portions when the side portions are in their closed position and having at least one exit passageway which communicates with the entrance of the passageways so that air can leave the plenum chamber and pass through the passageways, and a slideway in a vertically extending recess of said machine said bottom plate mechanism being mounted for vertically extending movement in said slideway.

2. A mould arrangement according to claim 1, wherein the bottom plate mechanism is mounted on a slideway in a vertically extending recess of the machine and the plenum chamber extends downwards in the mechanism and has an entrance which receives the air supplied by the air supply means from a vertically-extending opening in the portion of the frame bordering the recess.

3. A mould arrangement according to claim 2, wherein the opening in the portion of the frame bordering the recess communicates with a chamber in the bottom plate mechanism which communicates with the plenum chamber via a valve which is open only during the predetermined period.

4. A mould arrangement according to either one of claims 2 and 3, wherein the arrangement comprises a further plenum chamber which extends downwards in the mechanism and which extends beneath the side portions of a further mould and has exits which, when the side portions are in their closed position, communicate with entrances of passages in the side portions of the further mould, and the air supply means is arranged to supply mould cooling air to the further plenum chamber.

5. A mould arrangement according to claim 4, wherein the bottom plate mechanism comprises a connection to a source of vacuum which is connected to the bottom plates of the moulds by a branched pipe which passes through the plenum chambers but is sealed therefrom.

6. A mould arrangement according to either one of claims 2 and 3, wherein two further plenum chambers extend horizontally above the frame of the machine and have entrances which receive air supplied by the air supply means through telescopic connections to the interior of the frame on opposite sides of the recess, the further plenum chambers each extending beneath the side portions of a respective further mould and having exits which, when the side portions are in their closed position, communicate with entrances of passages in the side portions of the respective further mould.

7. A mould arrangement according to claim 6, wherein the bottom plate mechanism comprises a connection to a source of vacuum which is connected to the bottom plates of the moulds by a pipe which passes through the plenum chamber which extends downwards in the mechanism but is sealed therefrom and branches to the three bottom plates.

* * * * *